US012675132B2

(12) United States Patent (10) Patent No.: US 12,675,132 B2
Schwartzel et al. (45) Date of Patent: Jul. 7, 2026

(54) COMPUTING DEVICE SLIDER PLATE

(71) Applicant: Microsoft Technology Licensing, LLC, Redmond, WA (US)

(72) Inventors: Luke O Schwartzel, Bothell, WA (US); Errol Mark Tazbaz, Bellevue, WA (US); Denys V Yaremenko, Bellevue, WA (US); Brett Andrew Tomky, Seattle, WA (US); Devin Samuel Jacob Caplow-Munro, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 18/845,863

(22) PCT Filed: Mar. 20, 2023

(86) PCT No.: PCT/US2023/064714
§ 371 (c)(1),
(2) Date: Sep. 10, 2024

(87) PCT Pub. No.: WO2023/192787
PCT Pub. Date: Oct. 5, 2023

(65) Prior Publication Data
US 2025/0190022 A1 Jun. 12, 2025

(30) Foreign Application Priority Data
Mar. 30, 2022 (NL) ..................................... 2031452

(51) Int. Cl.
*G06F 1/16* (2006.01)
*H04M 1/02* (2006.01)
(52) U.S. Cl.
CPC .............. *G06F 1/1652* (2013.01); *G06F 1/16* (2013.01); *G06F 1/1601* (2013.01);
(Continued)

(58) Field of Classification Search
CPC ........ G06F 1/16; G06F 1/1601; G06F 1/1613; G06F 1/1616; G06F 1/1618; G06F 1/162;
(Continued)

(56) References Cited

U.S. PATENT DOCUMENTS 8,385,991 B2 2/2013 Wang et al.
9,342,101 B2 5/2016 Hsu
(Continued)

FOREIGN PATENT DOCUMENTS

CN 108520701 A 9/2018

OTHER PUBLICATIONS

Communication under Rule 71(3) EPC Received for European Application No. 23718583.0, mailed on Jul. 3, 2025, 09 pages.
(Continued)

*Primary Examiner* — Jason M Mandeville
(74) *Attorney, Agent, or Firm* — Alleman Hall LLP

(57) ABSTRACT

A computing device includes a flexible display supported by first and second display-supporting frames that are rotatably coupled via a spine. Each display-supporting frame comprises a backplate opposite the flexible display. Each display-supporting frame is coupled to a respective translation mechanism, and each translation mechanism is configured to translate the respective display-supporting frame relative to the spine as the display-supporting frame is rotated relative to the spine. A respective moveable slider plate for each display-supporting frame is biased into contact with the spine to cover at least a portion of an aperture at least partially defined by a leading edge of the respective backplate of the display-supporting frame and the spine.

20 Claims, 12 Drawing Sheets

(52) U.S. Cl.
CPC .......... *G06F 1/1613* (2013.01); *G06F 1/1616* (2013.01); *G06F 1/1618* (2013.01); *G06F 1/162* (2013.01); *G06F 1/1622* (2013.01); *G06F 1/1624* (2013.01); *G06F 1/1633* (2013.01); *G06F 1/1681* (2013.01); *H04M 1/022* (2013.01); *H04M 1/0268* (2013.01)

(58) Field of Classification Search
CPC .... G06F 1/1622; G06F 1/1624; G06F 1/1633; G06F 1/1652; G06F 1/1681; H04M 1/022; H04M 1/0268
USPC ...................................................... 361/679.27
See application file for complete search history.

(56) References Cited

U.S. PATENT DOCUMENTS

| | | | | |
|---|---|---|---|---|
| 9,348,450 | B1 * | 5/2016 | Kim .................... | H04M 1/0268 |
| 9,603,271 | B2 | 3/2017 | Lee | |
| 10,345,867 | B2 | 7/2019 | Tan | |
| 10,488,882 | B2 | 11/2019 | Määttä et al. | |
| 10,575,415 | B2 | 2/2020 | Shin | |
| 10,615,362 | B2 | 4/2020 | Ahn | |
| 10,782,739 | B2 | 9/2020 | Ou | |
| 11,301,007 | B2 * | 4/2022 | Kinoshita ............. | G06F 1/1681 |
| 11,917,780 | B2 * | 2/2024 | Caplow-Munro ... | H05K 5/0226 |
| 12,061,499 | B2 * | 8/2024 | Schwartzel .......... | G06F 1/1652 |
| 2020/0267245 | A1 | 8/2020 | Li et al. | |
| 2020/0281085 | A1 | 9/2020 | Jia | |
| 2021/0397226 | A1 | 12/2021 | Siddiqui | |

OTHER PUBLICATIONS

International Search Report and Written Opinion received for PCT Application No. PCT/US2023/064714, Jun. 15, 2023, 09 pages.
Netherlands Search Report received in Patent Application No. N2031452, Mailed Mar. 30, 2022, 9 Pages.

* cited by examiner

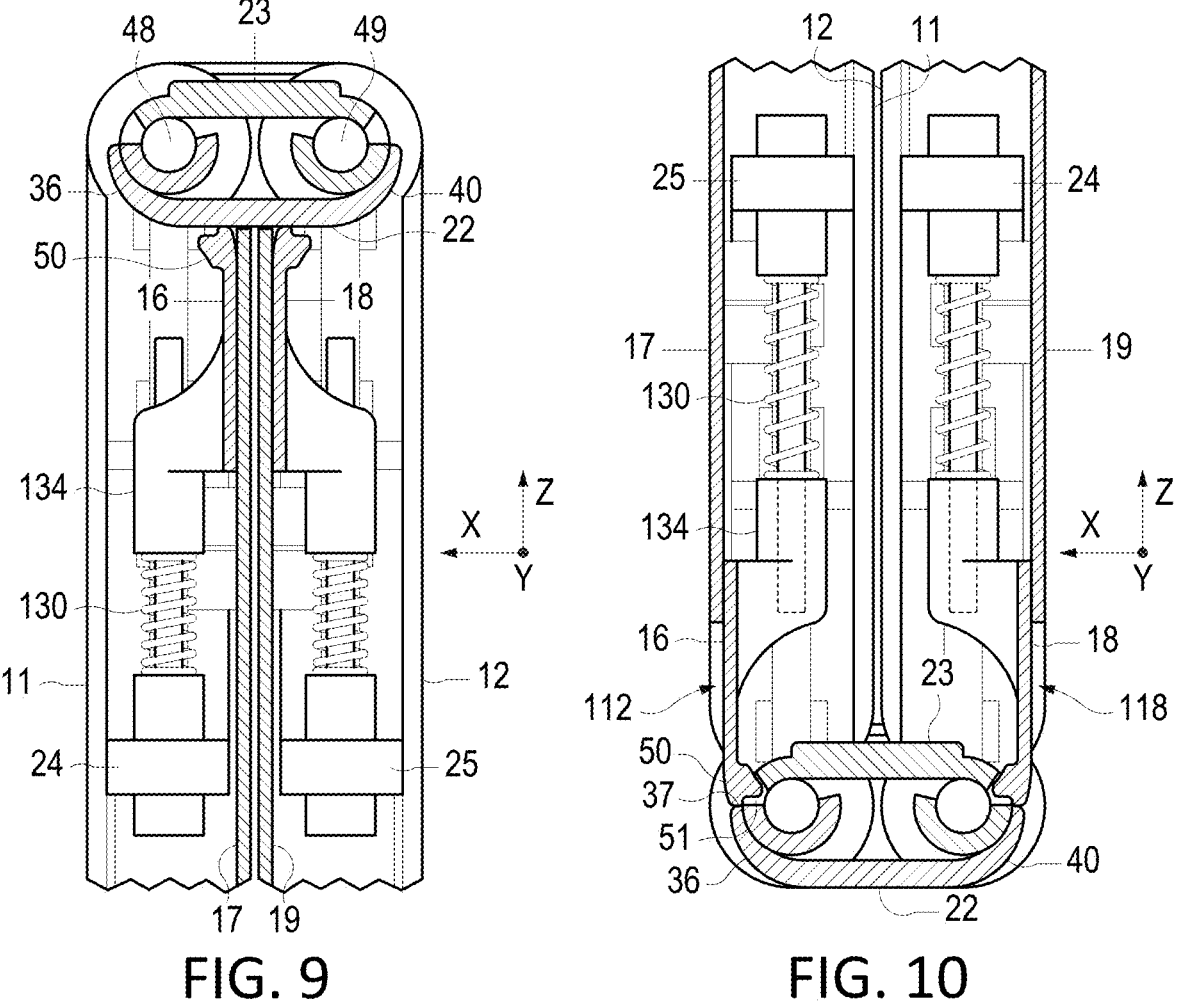
FIG. 9                    FIG. 10

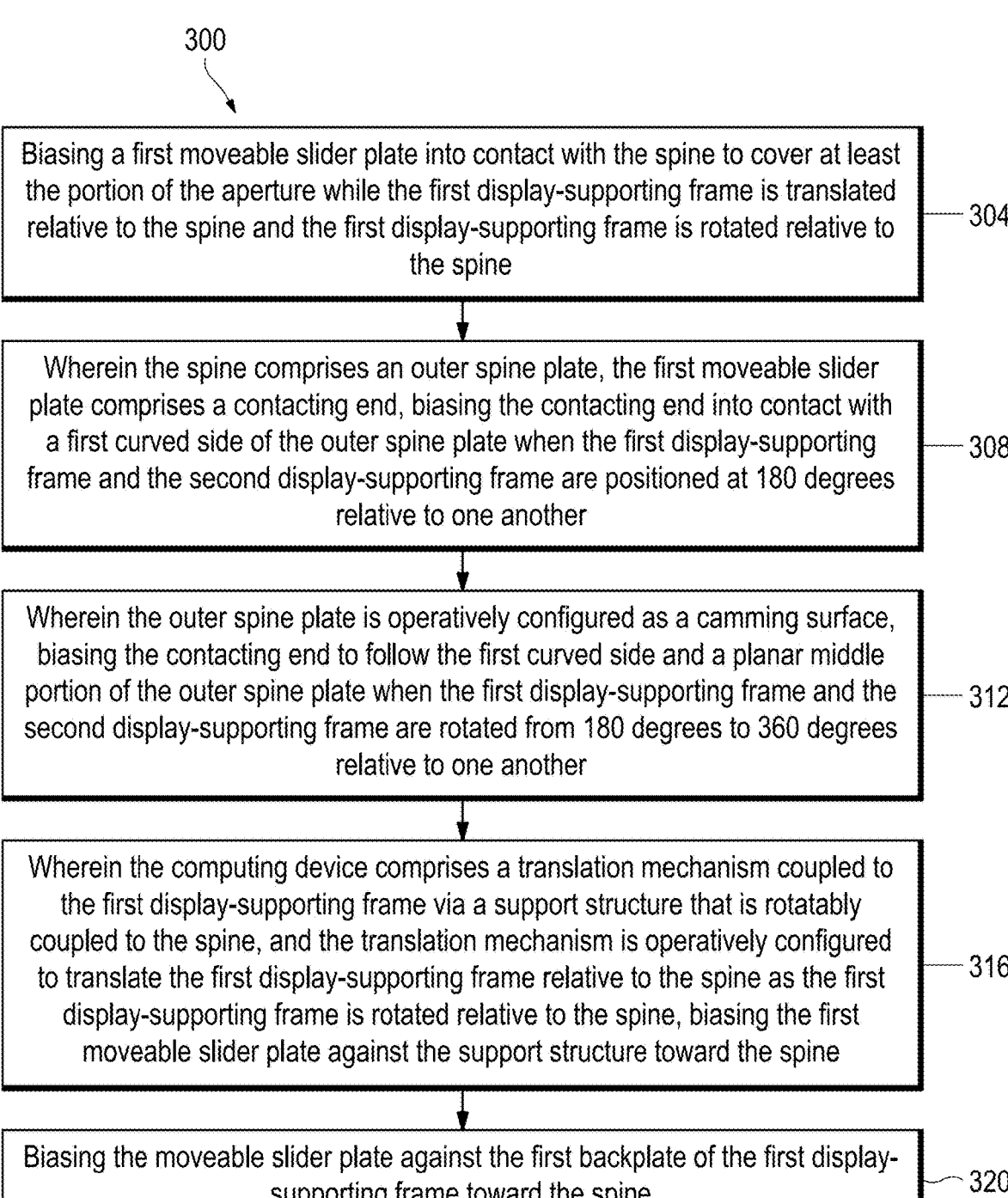

300

Biasing a first moveable slider plate into contact with the spine to cover at least the portion of the aperture while the first display-supporting frame is translated relative to the spine and the first display-supporting frame is rotated relative to the spine — 304

Wherein the spine comprises an outer spine plate, the first moveable slider plate comprises a contacting end, biasing the contacting end into contact with a first curved side of the outer spine plate when the first display-supporting frame and the second display-supporting frame are positioned at 180 degrees relative to one another — 308

Wherein the outer spine plate is operatively configured as a camming surface, biasing the contacting end to follow the first curved side and a planar middle portion of the outer spine plate when the first display-supporting frame and the second display-supporting frame are rotated from 180 degrees to 360 degrees relative to one another — 312

Wherein the computing device comprises a translation mechanism coupled to the first display-supporting frame via a support structure that is rotatably coupled to the spine, and the translation mechanism is operatively configured to translate the first display-supporting frame relative to the spine as the first display-supporting frame is rotated relative to the spine, biasing the first moveable slider plate against the support structure toward the spine — 316

Biasing the moveable slider plate against the first backplate of the first display-supporting frame toward the spine — 320

FIG. 19

COMPUTING DEVICE SLIDER PLATE

CROSS REFERENCE TO RELATED APPLICATIONS

The present application is a U.S. National Phase of International Patent Application Serial No. PCT/US2023/064714 entitled "COMPUTING DEVICE SLIDER PLATE", filed Mar. 20, 2023, which claims priority to Netherlands Patent Application Serial No. 2031452, filed Mar. 30, 2022, the entire contents of each of which are hereby incorporated by reference for all purposes.

BACKGROUND

Some foldable computing devices utilize a flexible display substrate that can deform as the device's support surfaces are folded.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to moveable plates for covering apertures in computing devices that utilize a flexible display that deforms as the device's support surfaces are folded. In one example, a computing device comprises a flexible display supported by a first display-supporting frame and a second display-supporting frame. The first display-supporting frame comprises a first backplate opposite to the flexible display, and the second display-supporting frame comprises a second backplate opposite to the flexible display. The first display-supporting frame is rotatably coupled to the second display-supporting frame via a spine.

A translation mechanism is coupled to the first display-supporting frame and configured to translate the first display-supporting frame relative to the spine as the first display-supporting frame is rotated relative to the spine. A first moveable slider plate is biased into contact with the spine to cover at least a portion of an aperture at least partially defined by a first leading edge of the first backplate and the spine.

Another example provides a method for covering at least a portion of an aperture in a computing device, the aperture at least partially defined by a first leading edge of a first backplate and a spine of the computing device. The computing device comprises a flexible display supported by a first display-supporting frame and a second display-supporting frame, with the first display-supporting frame comprising the first backplate opposite to the flexible display, and the second display-supporting frame comprising a second backplate opposite to the flexible display. The first display-supporting frame is rotatably coupled to the second display-supporting frame via the spine. The method comprises biasing a first moveable slider plate into contact with the spine to cover at least the portion of the aperture while the first display-supporting frame is translated relative to the spine and the first display-supporting frame is rotated relative to the spine.

In another example, a computing device foldable through 360 degrees comprises a flexible display supported by a first display-supporting frame and a second display-supporting frame. The first display-supporting frame comprises a first backplate opposite to the flexible display, and the second display-supporting frame comprises a second backplate opposite to the flexible display. The first display-supporting frame is rotatably coupled to the second display-supporting frame via a spine that comprises an outer spine plate.

A translation mechanism is coupled to the first display-supporting frame and configured to translate the first display-supporting frame relative to the spine as the first display-supporting frame is rotated relative to the spine. The translation mechanism comprises a support structure rotatably coupled to the spine, wherein the first display-supporting frame is moveably coupled to the support structure. A first moveable slider plate is biased into contact with the outer spine plate to cover at least a portion of an aperture at least partially defined by a first leading edge of the first backplate and the outer spine plate, wherein the first moveable slider plate is biased against the support structure toward the spine.

BRIEF DESCRIPTION OF THE DRAWINGS

FIG. 9 shows the computing device of FIG. 7 in which the first display-supporting frame and the second display-supporting frame are in the back-to-back 360-degree orientation.

FIG. 10 shows the computing device of FIG. 7 in which the first display-supporting frame and the second display-supporting frame are in the face-to-face zero-degree orientation.

FIG. 19 shows a flow diagram of an example method for covering at least a portion of an aperture in a computing device according to examples of the present disclosure.

DETAILED DESCRIPTION

As noted above, some computing devices utilize a flexible display substrate that can deform as support surfaces beneath the flexible display are folded. In some of these devices, hinges couple two support surfaces for folding 180 degrees from a flat orientation in which the flexible display is substantially planar to a closed or zero-degree face-to-face orientation in which one portion of the flexible display is on top of the opposing portion. However, these devices are incapable of folding the display in the opposite direction into an open or back-to-back orientation with the display on the outside. One reason for this limitation is that hinge designs are utilized that would stretch and exert damaging tensile stresses on the flexible display substrate upon folding the support surfaces from the flat orientation toward an open or back-to-back orientation.

To enable a flexible display device to open into a 360-degree, back-to-back orientation with the display substrate on the outside, a device may utilize moveable display support structures opposite to the display substrate that translate toward the middle spine of the device as the structures rotate from a 180-degree orientation to a 360-degree orientation. However, to provide space for such support structures to translate, gaps are created in the rear of the device between the support structures and the middle spine. Such gaps could allow undesirable foreign material to enter the interior of the device and would be visually unappealing to the user.

Accordingly, the present disclosure describes moveable plates for covering apertures in computing devices that utilize a flexible display that deforms as the device's support surfaces are folded. As described in more detail below, computing devices of the present disclosure include a flexible display supported by first and second display-supporting frames. The first display-supporting frame comprises a first backplate opposite to the flexible display, and the second display-supporting frame comprises a second backplate opposite to the flexible display. The first display-supporting frame is rotatably coupled to the second display-supporting frame via a spine.

A translation mechanism is coupled to the first display-supporting frame and configured to translate the first display-supporting frame relative to the spine as the first display-supporting frame is rotated relative to the spine. A first moveable slider plate is biased into contact with the spine to cover at least a portion of an aperture at least partially defined by a first leading edge of the first backplate and the spine. Advantageously, and as described in more detail below, by covering at least a portion of the aperture created by the first backplate and the spine, the moveable slider plate helps to prevent foreign material from entering into the device and provides a more aesthetically pleasing appearance to the rear of the device.

Figure 1:
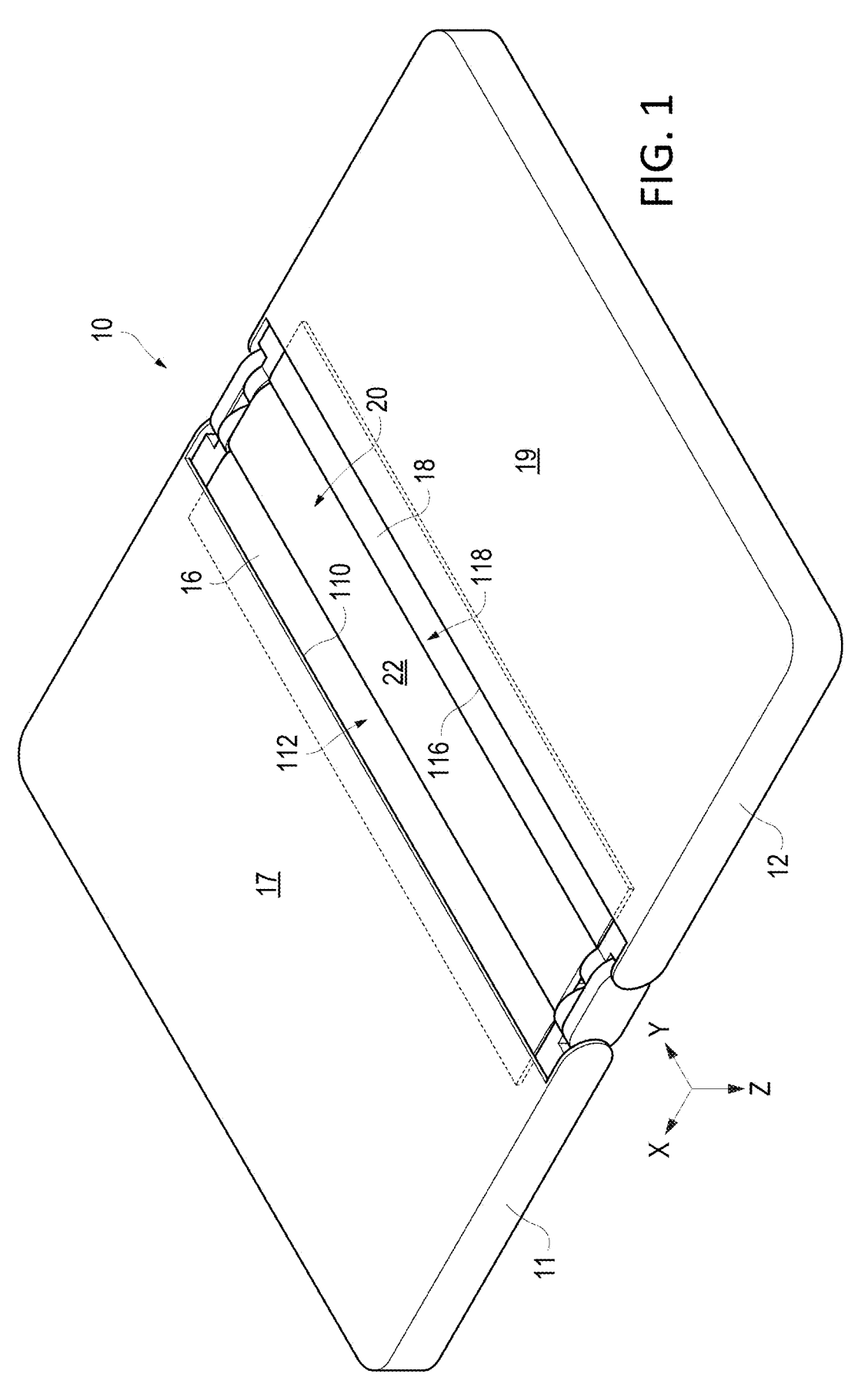
FIG. 1 shows a non-display side of one example of a foldable computing device utilizing moveable slider plates according to examples of the present disclosure.
Figure 6:
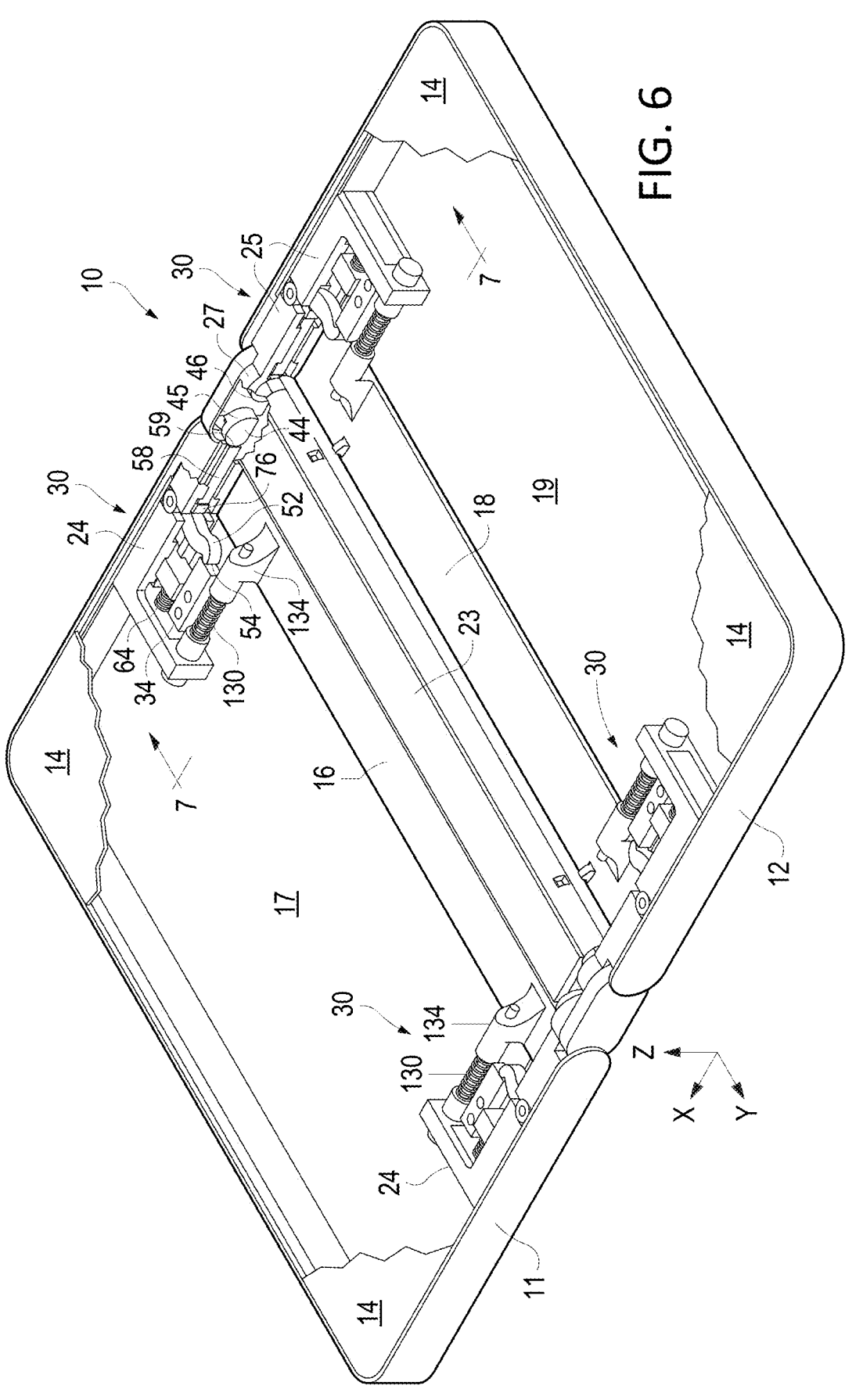
FIG. 6 shows a display-side and partial cutaway view of one example of the computing device of FIG. 1 in the end-to-end orientation according to examples of the present disclosure.

FIGS. 1-10 show one example of a computing device 10 and first and second moveable slider plates 16, 18 according to examples of the present disclosure. In this example and with reference to FIGS. 1 and 6, computing device 10 is foldable about a spine 20 and includes a flexible display 14 supported by a first display-supporting frame 11 and by a second display-supporting frame 12. As shown in FIGS. 1 and 6, the first display-supporting frame 11 comprises a first backplate 17 opposite to the flexible display 14, the second display-supporting frame 12 comprises a second backplate 19 opposite to the flexible display 14.

In this example, the first display-supporting frame 11 is rotatably coupled to the second display-supporting frame 12 via the spine 20 that includes one outer spine plate 22 and one inner spine plate 23 opposite to the outer spine plate (see FIGS. 2 and 6-10). As schematically illustrated in FIGS. 3-5, the first display-supporting frame 11 is rotatably coupled via spine 20 to the second display-supporting frame 12 for 360 degrees of rotation relative to one another. More particularly, the first and second display-supporting frames 11, 12 can be rotated from a closed or zero-degree face-to-face orientation in which the flexible display 14 is folded in the interior of the device (see FIGS. 2 and 3), to an end-to-end 180-degree orientation of the first display-supporting frame 11 relative to the second display-supporting frame 12 in which the flexible display 14 is planar and spans across the first display-supporting frame and the second display-supporting frame (see FIG. 4), to an open or 360-degree back-to-back orientation of the first display-supporting frame relative to the second display-supporting frame in which a first portion of the flexible display extends across the first display-supporting frame, a middle portion of the flexible display wraps around the spine 20, and a second portion of the flexible display extends across the second display-supporting frame (see FIG. 5).

Figures 2, 3, 4, 5:
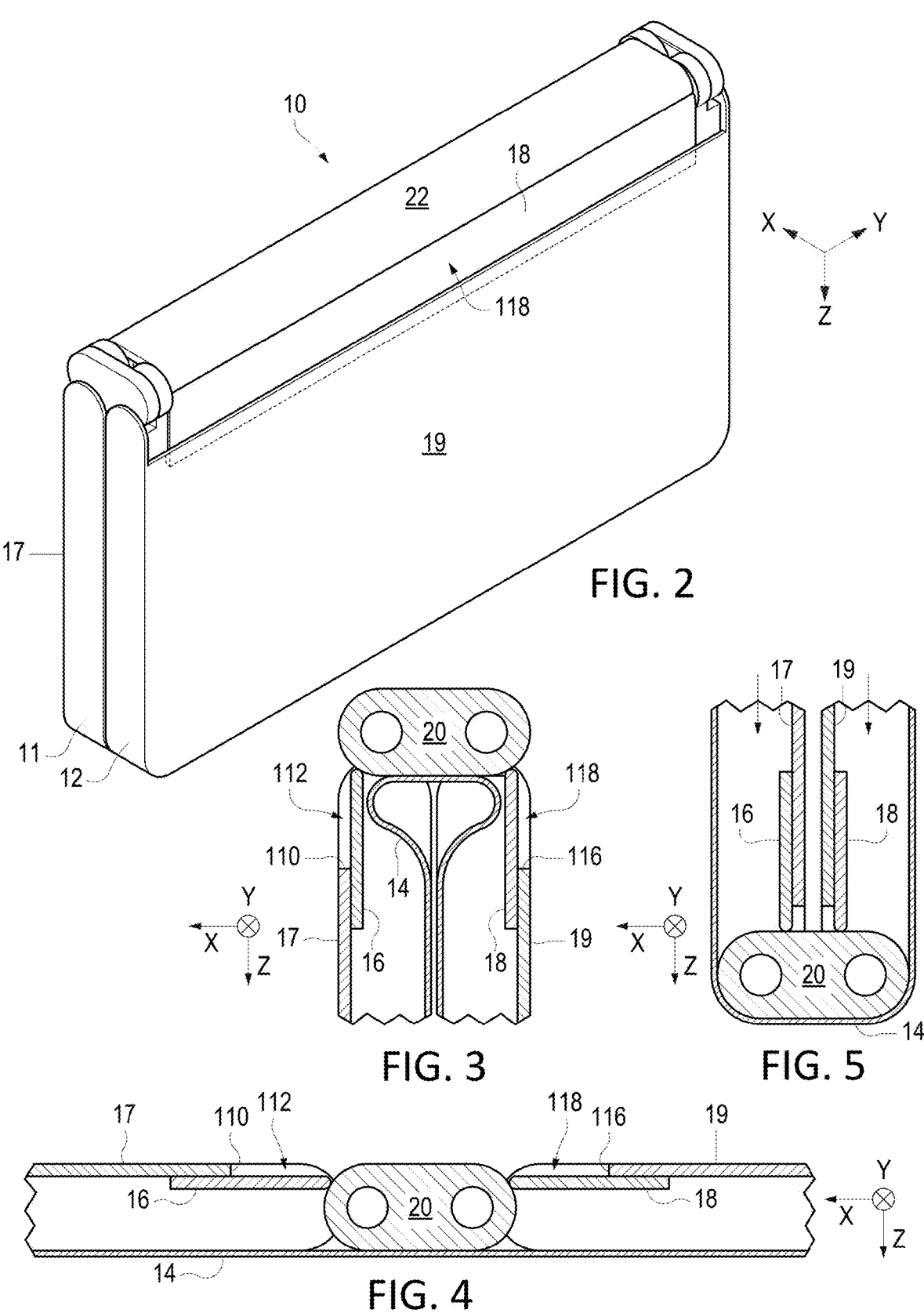
FIG. 2 shows the computing device of FIG. 1 folded in a face-to-face orientation.
FIG. 3 shows a schematic end view of the computing device in the face-to-face orientation with a flexible display inside.
FIG. 4 shows a schematic end view of the computing device in an end-to-end orientation.
FIG. 5 shows a schematic end view of the computing device in a back-to-back orientation with the flexible display on the outside.

Additionally, as schematically illustrated in FIGS. 3-5 and in one potential advantage of the present disclosure, a first moveable slider plate 16 is biased into contact with the spine 20 to cover at least a portion of a first aperture 112 that is at least partially defined by a first leading edge 110 of the first backplate 17 and the spine 20. Similarly, an opposing second moveable slider plate 18 is biased into contact with the spine 20 to cover at least a portion of a second aperture 118 that is at least partially defined by a second leading edge 116 of the second backplate 19 and the spine 20. As described further below, the apertures 112 and 118 are created via the moveable first backplate 17 and second backplate 19, respectively, that enable 360-degree rotation of the device.

To provide such 360 degrees of rotation, the computing device 10 includes translation mechanisms 30 for translating the first display-supporting frame 11 and the second display-supporting frame 12 relative to the spine 20 of the computing device 10. By coordinating the translations of these frames with rotation of the frames about a middle spine, tensile stresses exerted on the flexible display substrate during folding of the frames into the closed or face-to-face orientation are minimized or substantially eliminated, thereby enabling a mechanism that provides closing of the frames into the face-to-face orientation and, in some examples, a full 360-degree rotation relative to one another.

With reference to FIG. 6, in this example the computing device 10 includes two translation mechanisms 30 at opposing sides of the first display-supporting frame 11 and two translation mechanisms 30 at opposing sides of the second display-supporting frame 12. As described in more detail below, each translation mechanism 30 includes a cam, cam follower, and multiplier lever that cooperate to cause translation of the coupled display-supporting frame toward and away from the spine of the computing device. For ease of description, one translation mechanism 30 will be described in more detail below. It will be appreciated that the following description applies to each translation mechanism 30 of computing device 10 and its functional relationship to the corresponding display-supporting frame.

Figures 7, 8:
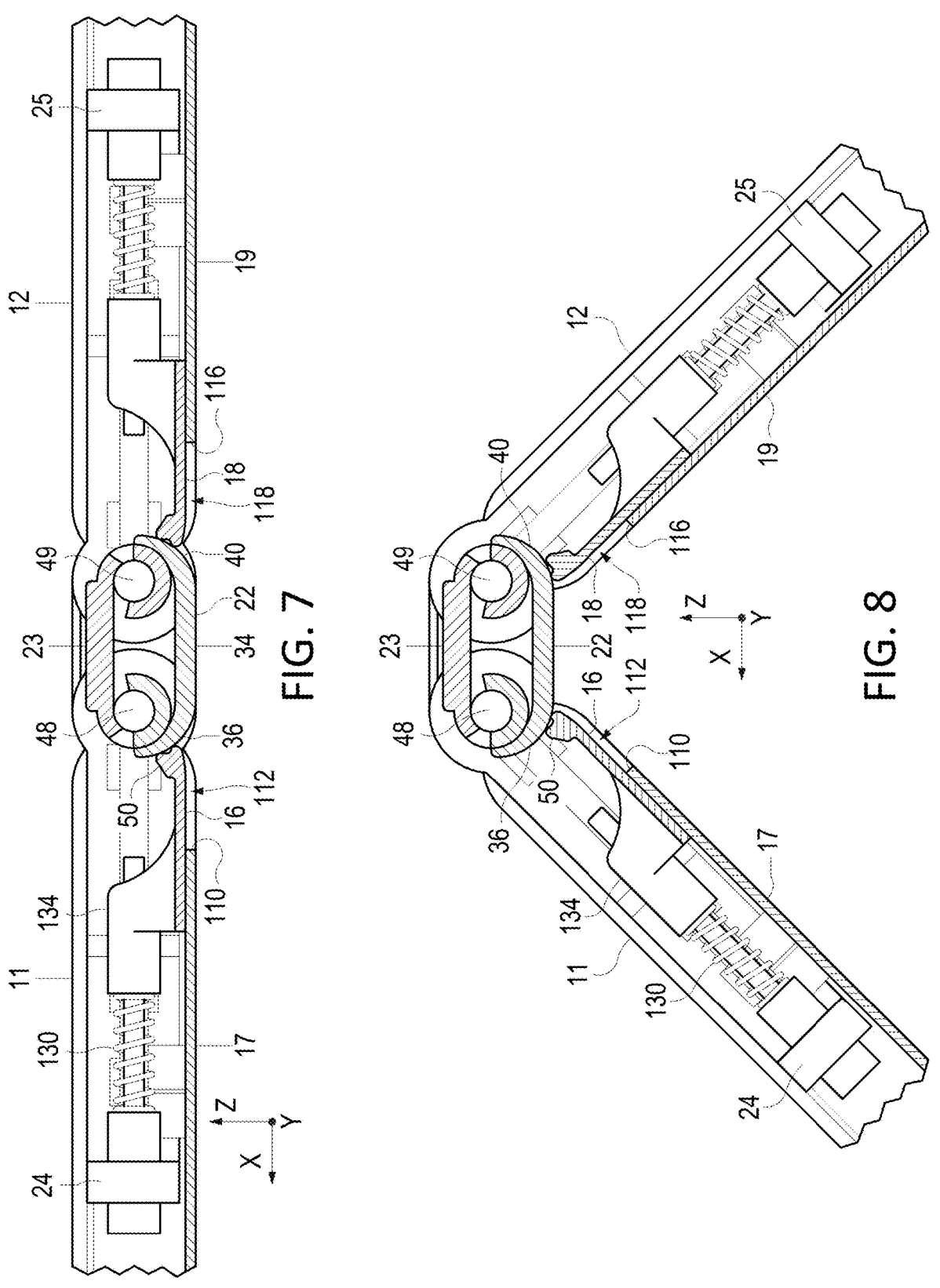
FIG. 7 shows a partial cross-section view taken along line 7-7 in FIG. 6.
FIG. 8 shows the computing device of FIG. 7 in which the first display-supporting frame and the second display-supporting frame are in a 270-degree orientation.

With reference to FIGS. 6 and 7, a translation mechanism 30 for translating the first display-supporting frame 11 comprises a first cam 44 that includes a first shaft 48 extending into the spine 20. Similarly, a translation mechanism 30 for translating the second display-supporting frame 12 comprises a second cam 46 that includes a second shaft 49 extending into spine 20. In this example the inner spine plate 23 also forms at least a portion of the bearing surface that contains the first and second shafts 48, 49 for rotation. In FIG. 6 a portion of a second cam housing 27 that is part of second support structure 25 is also shown, while a first cam housing for the first cam 44 is not shown for descriptive purposes. As described in more detail below, rotation of the first cam 44 causes translation of the first display-supporting frame 11 as a function of the rotation of the first cam. Likewise, rotation of the second cam 46 causes translation of the second display-supporting frame 12 as a function of the rotation of the second cam.

Each translation mechanism 30 includes a support structure that is rotatably coupled to the spine 20 of the computing device. With reference again to FIG. 6, a first support structure 24 and a second support structure 25 are shown. The first display-supporting frame 11 is moveably coupled to the first support structure 24 to enable movement of the first display-supporting frame 11 relative to the spine 20. Similarly, the second display-supporting frame 12 is moveably coupled to the second support structure 25 to enable movement of the second display-supporting frame relative to the spine 20.

The first cam 44 includes a first camming surface 45 that decreases in radius from the cam orientation shown in FIG. 6 to an orientation in which the first and second display-supporting frames 11, 12 are in the open or 360-degree back-to-back orientation of FIG. 9. In this example, the radius of the first camming surface 45 is defined as the distance in the x-axis direction from the center of rotation of the first cam 44 to the first camming surface. In this manner, the first cam 44 cooperates with a cam follower 58 and a multiplier lever in the form of an elongated arm 52 to translate the first display-supporting frame 11 relative to the first support structure 24 as a function of the rotation of the of the first cam.

With reference to FIG. 6, a follower surface 59 of the cam follower 58 abuts the first camming surface 45 of first cam 44. An opposing contacting surface 76 of cam follower 58 contacts the elongated arm 52 adjacent to its coupling to the first support structure 24. In this manner, the cam follower 58 translates rotational movement of the first cam 44 into rotational movement of the elongated arm 52. The elongated arm 52 comprises a multiplying surface 54, opposite to the arm's coupling to the first support structure 24, that contacts an engagement structure 34 affixed to the first display-supporting frame 11. A translation mechanism spring 64 biases the engagement structure 34 (and affixed first display-supporting frame 11) in the negative x-axis direction, which biases the elongated arm 52 against the cam follower 58, which biases the follower surface 59 of the cam follower 58 against the first camming surface 45. In this manner and as noted above, these components cooperate to translate the first display-supporting frame 11 relative to the first support structure 24 and toward or away from the spine 20 as the first display-supporting frame 11 and the second display-supporting frame 12 are rotated relative to one another.

With reference now to FIGS. 7-10, operation of the moveable slider plates will now be described. In this example, the spine 20 comprises one outer spine plate 22 and an opposing inner spine plate 23. The outer spine plate 22 comprises a planar middle portion 34 that transitions into a first curved side 36 and an opposing second curved side 40. In this example and with reference to FIG. 7, the first moveable slider plate 16 comprises a contacting end 50 that is biased into contact with the first curved side 36 of the outer spine plate 22 when the first display-supporting frame 11 and the second display-supporting frame 12 are positioned at 180 degrees relative to one another. In this example, the first moveable slider plate 16 is biased against the first support structure 24 toward the spine 20. More particularly, a first slider plate spring 130 is sprung between the first support structure 24 and a first stanchion 134 that is affixed to the first slider plate 16. Accordingly, and in one potential advantage of the present disclosure, by biasing the contacting end 50 of the first slider plate 16 into contact with the first curved side 36 of the outer spine plate 22, the first slider plate 16 covers at least a portion of the first aperture 112 that is at least partially defined by the first leading edge 110 of the first backplate 17 and the outer spine plate 22 of the spine 20.

Additionally, as shown in FIGS. 8 and 9 and in another potential advantage of the present disclosure, the outer spine plate 22 is operatively configured as a camming surface, and the contacting end 50 of the first moveable slider plate 16 is operatively configured to follow the first curved side 36 and the planar middle portion 34 of the outer spine plate as its angle of attack changes when the first display-supporting frame 11 and the second display-supporting frame 12 are rotated from 180 degrees to 360 degrees relative to one another. Advantageously, in this manner the first moveable slider plate 16 provides continuous coverage of the first aperture 112 as the first display-supporting frame 11 and first backplate 17 translate toward the spine 20. As shown in FIGS. 6-9, it will also be appreciated that the second moveable slider plate 18 is configured in the same manner to provide continuous coverage of the second aperture 118 as the second display-supporting frame 12 and second backplate 19 translate toward the spine 20.

With reference now to FIG. 10, the first and second display-supporting frames 11, 12 are shown in the closed or zero-degree face-to-face orientation in which the flexible display (not shown) is folded in the interior of the device. In the present example, and in another potential advantage of the present disclosure, the contacting end 50 of the first moveable slider plate 16 defines a groove 51 that is operatively configured to capture the first edge 37 of the first curved side 36 of the outer spine plate 22 when the first display-supporting frame 11 and the second display-supporting frame 12 are positioned at zero degrees relative to one another as shown, and the contacting end is dislodged from contacting the first edge of the first curved side. In this orientation, with the first slider plate spring 130 biasing the contacting end 50 against the first edge 37 of the first curved side 36 in the negative z-axis direction, in some cases of dropping the device or other inadvertent impacts, the contacting end could be dislodged in the x-axis direction. In these cases, by providing groove 51 in the contacting end 50, the groove 51 advantageously captures the first edge 37 and stops the first moveable slider plate 16 from advancing further. In this manner, with the groove 51 capturing the first edge 37 of the first curved side 36, the first moveable slider plate 16 can be easily reset to its desired position with the contacting end 50 contacting the first edge 37.

Figure 11:
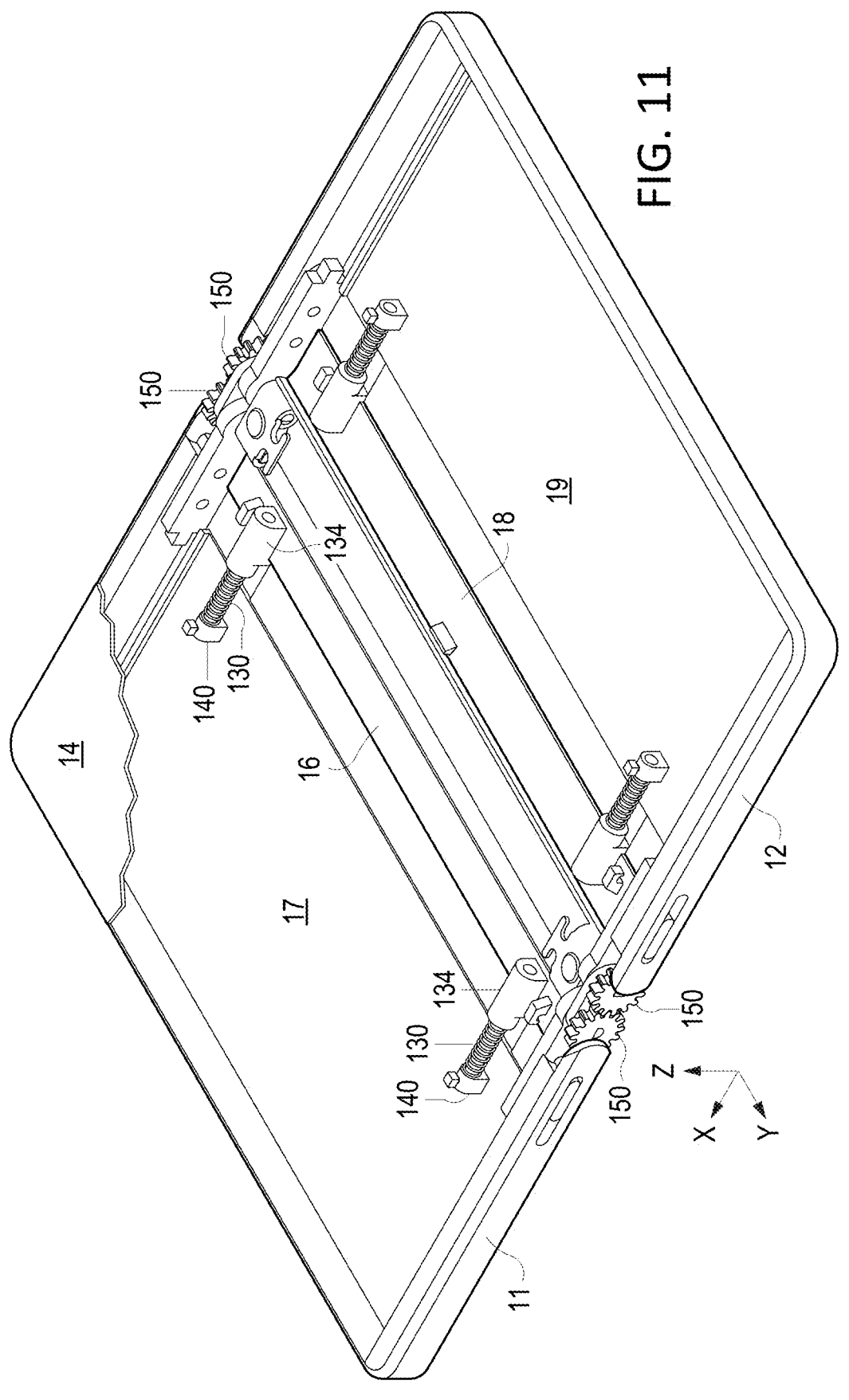
FIG. 11 shows a display-side and partial cutaway view of another example of the computing device of FIG. 1 in the end-to-end orientation according to examples of the present disclosure.

With reference now to FIG. 11, a display-side and partial cutaway view of another example of the computing device 10 of FIG. 1 in the end-to-end orientation is provided. In this example, the first display-supporting frame 11 and the second display-supporting frame 12 are coupled together via gears 150 to synchronize rotation of the first display-supporting frame and the second display-supporting frame relative to one another. It will also be appreciated that in some examples the computing device described above also may utilize similar gears (not shown) to synchronize rotation of the first display-supporting frame and the second display-supporting frame relative to one another.

In the example of FIG. 11, the first moveable slider plate 16 is biased against the first backplate 17 of the first display-supporting frame 11 toward the spine. More particularly, a first slider plate spring 130 is sprung between a first stanchion 134 affixed to the first moveable slider plate 16 and a first backplate stanchion 140 affixed to the first backplate 17. In one potential advantage of this configuration, the first moveable slider plate 16 is decoupled from the support structure of the translation mechanism, thereby allowing for a more compact design and footprint of the translation mechanism.

With reference now to FIGS. 12-18, another example of a computing device 200 according to examples of the present disclosure is provided. As described in more detail below, in this example the outer spine plate of the previous examples is replaced by two rotatable partial barrels that each extend across the width of the computing device 200. The moveable slider plates are biased against the barrels to cover at least portions of the apertures defined by the backplates and the barrels. In different examples, the computing device 200 can utilize the translation mechanisms 30 and other components described above.

Figure 12:
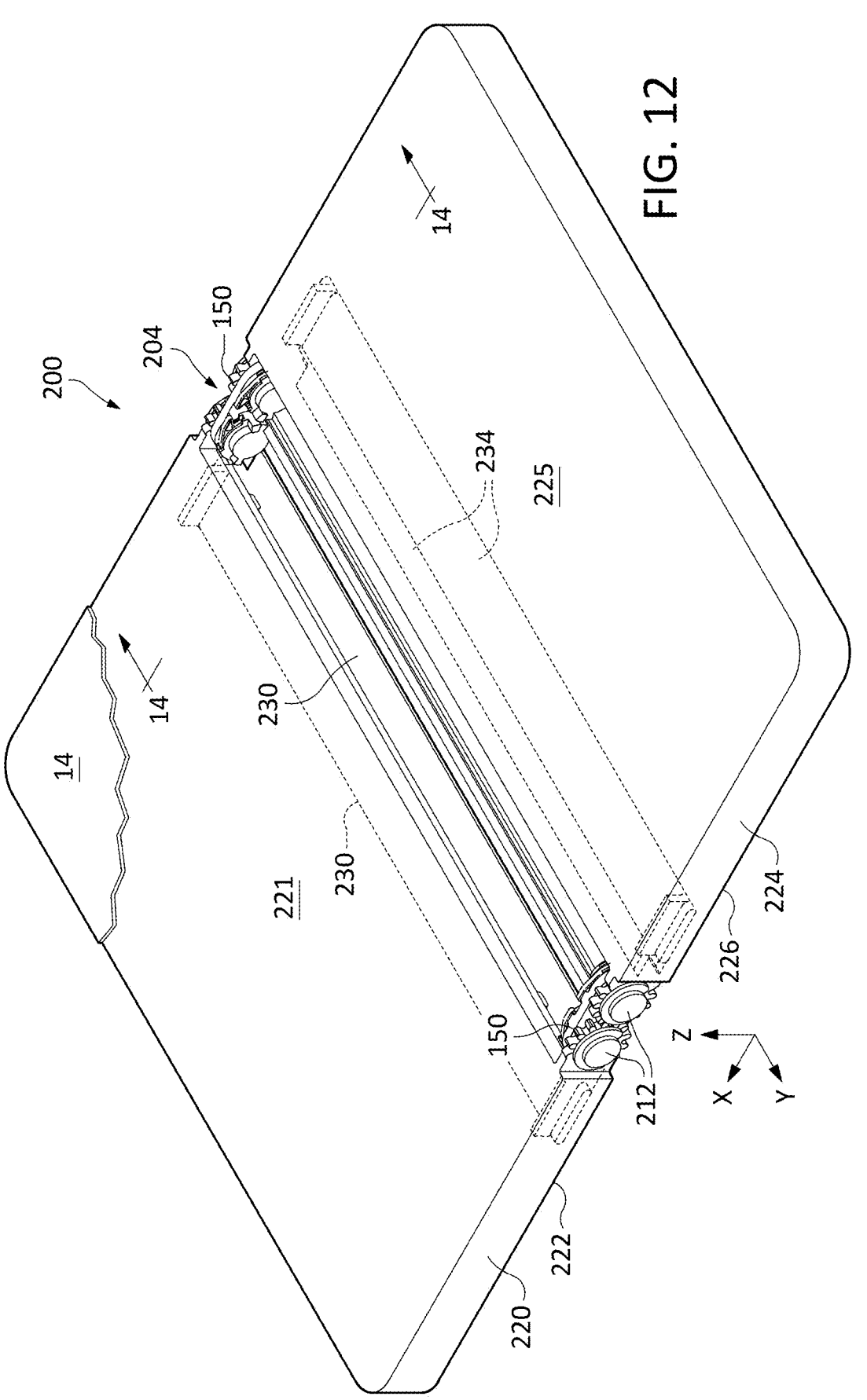
FIG. 12 shows a display-side and partial cutaway view of another example of a computing device in the end-to-end orientation according to examples of the present disclosure.
Figure 13:
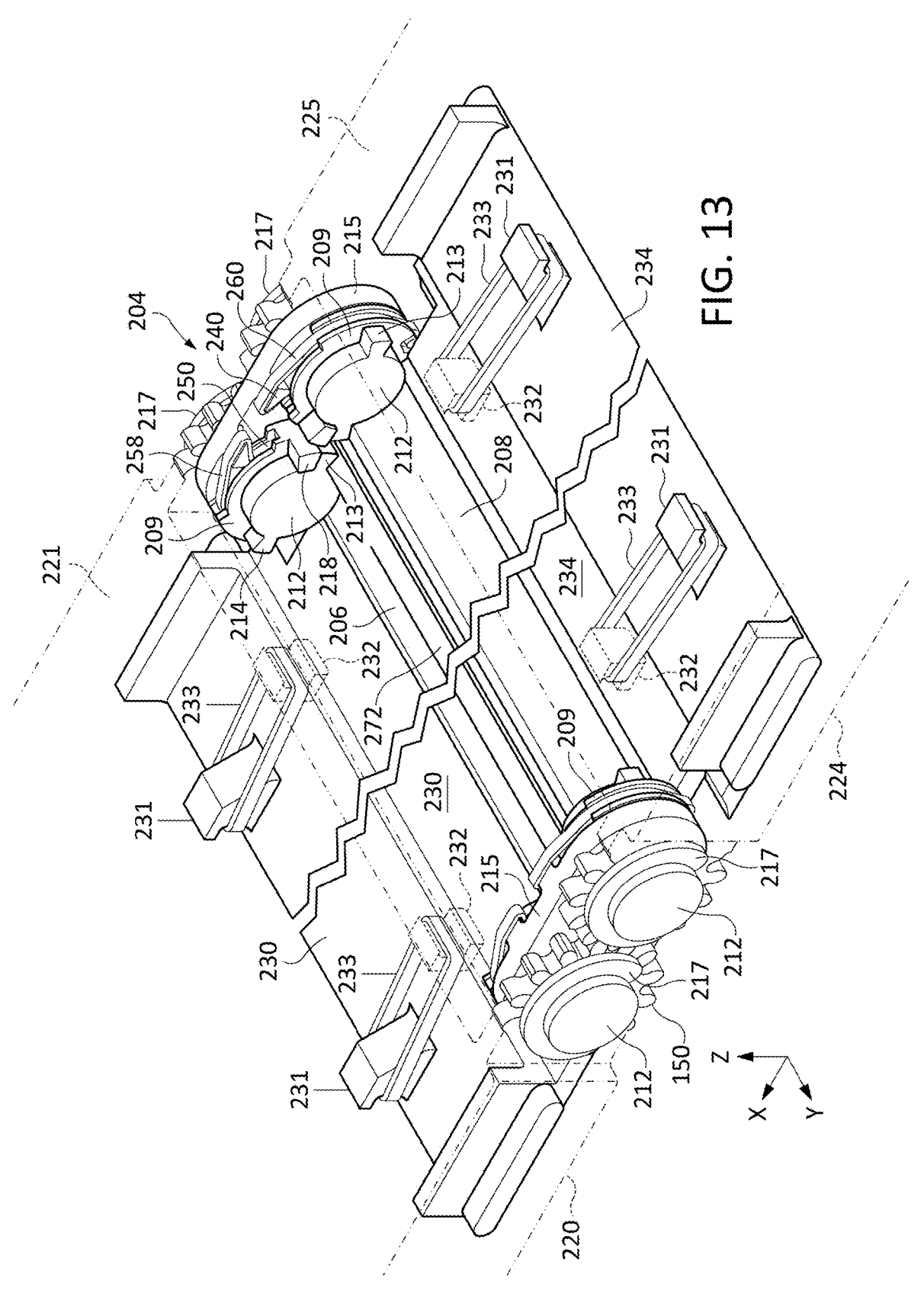
FIG. 13 is a partial view of the computing device of FIG. 12 showing first and second rotatable partial barrels that cooperate with moveable slider plates according to examples of the present disclosure.
Figures 14, 15:
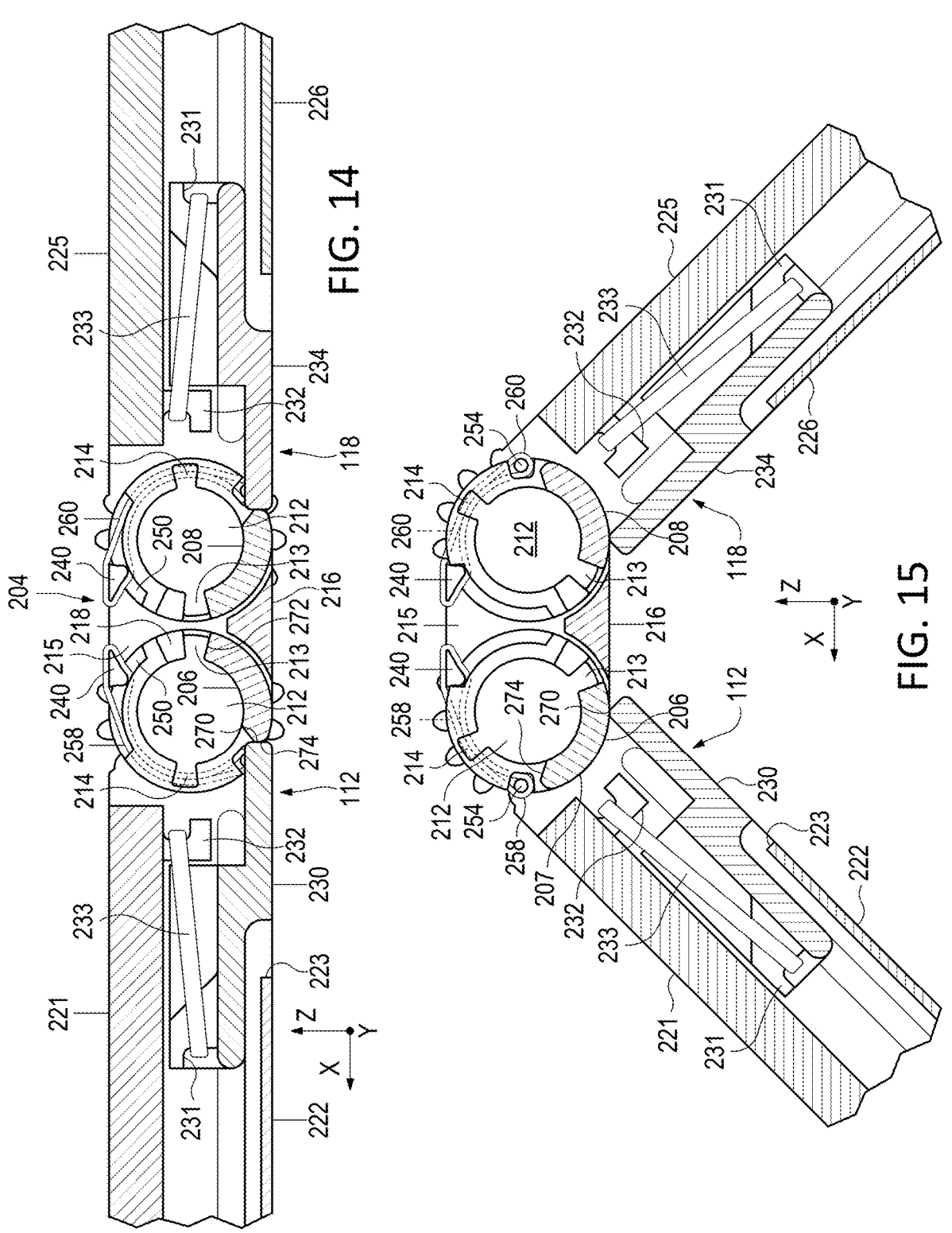
FIG. 14 shows a partial cross section view of the rotatable partial barrels and moveable slider plates taken along line 14-14 in FIG. 12.
FIG. 15 shows the first display-supporting frame and the second display-supporting frame in a 270-degree orientation.

As shown in FIGS. 12-14, in this example the computing device 200 includes a first display-supporting frame 220 comprising a first upper frame 221 and a first backplate 222, and a second display-supporting frame 224 comprising a second upper frame 225 and a second backplate 226. The first display-supporting frame 220 and the second display-supporting frame 224 are coupled together via spine 204 and gears 150 to synchronize rotation of the first display-supporting frame and the second display-supporting frame relative to one another.

In this example the spine 204 of computing device 200 includes a first rotatable partial barrel 206 and a second rotatable partial barrel 208. Each of the first and second rotatable partial barrels 206, 208 includes circular end portions 209 through which a pin 212 extends. The spine 204 further comprises a spine frame 215 that includes a midplate 216 configured to at least partially contain and guide rotation of the first rotatable partial barrel 206 and a second rotatable partial barrel 208. The spine frame 215 also includes openings (not shown) through which the pins 212 extend. C-clips 217 secure the pins 212 to the outer ends of gears 150.

Each of the pins 212 include opposing first ears 213 and second ears 214. As shown in FIGS. 13 and 14, each of the first ears 213 are captured between an inner barrel protrusion 218 extending inwardly from the circular end portion 209 and a first lip 272 of the corresponding rotatable partial barrel.

With reference to FIG. 14, in this example a first moveable slider plate 230 comprises a contacting end 270 that is biased into contact with a second lip 274 of the first rotatable partial barrel 206 when the first display-supporting frame 220 and the second display-supporting frame 224 are positioned at 180 degrees relative to one another. In this example, the first moveable slider plate 230 is biased against the first upper frame 221 toward the spine 204. More particularly, a first slider plate biasing element in the form of an elastic band 233 is retained between a slider plate attachment feature 231 attached to first moveable slider plate 230 and an upper frame attachment feature 232 that is affixed to the first upper frame 221. Accordingly, and in one potential advantage of the present disclosure, by biasing the contacting end 270 of the first moveable slider plate 230 into contact with the second lip 274 of the first rotatable partial barrel 206, the first moveable slider plate 230 covers at least a portion of the first aperture 112 that is at least partially defined by the first leading edge 223 of the first backplate 222 and the first rotatable partial barrel 206 of the spine 204.

Figures 16, 17:
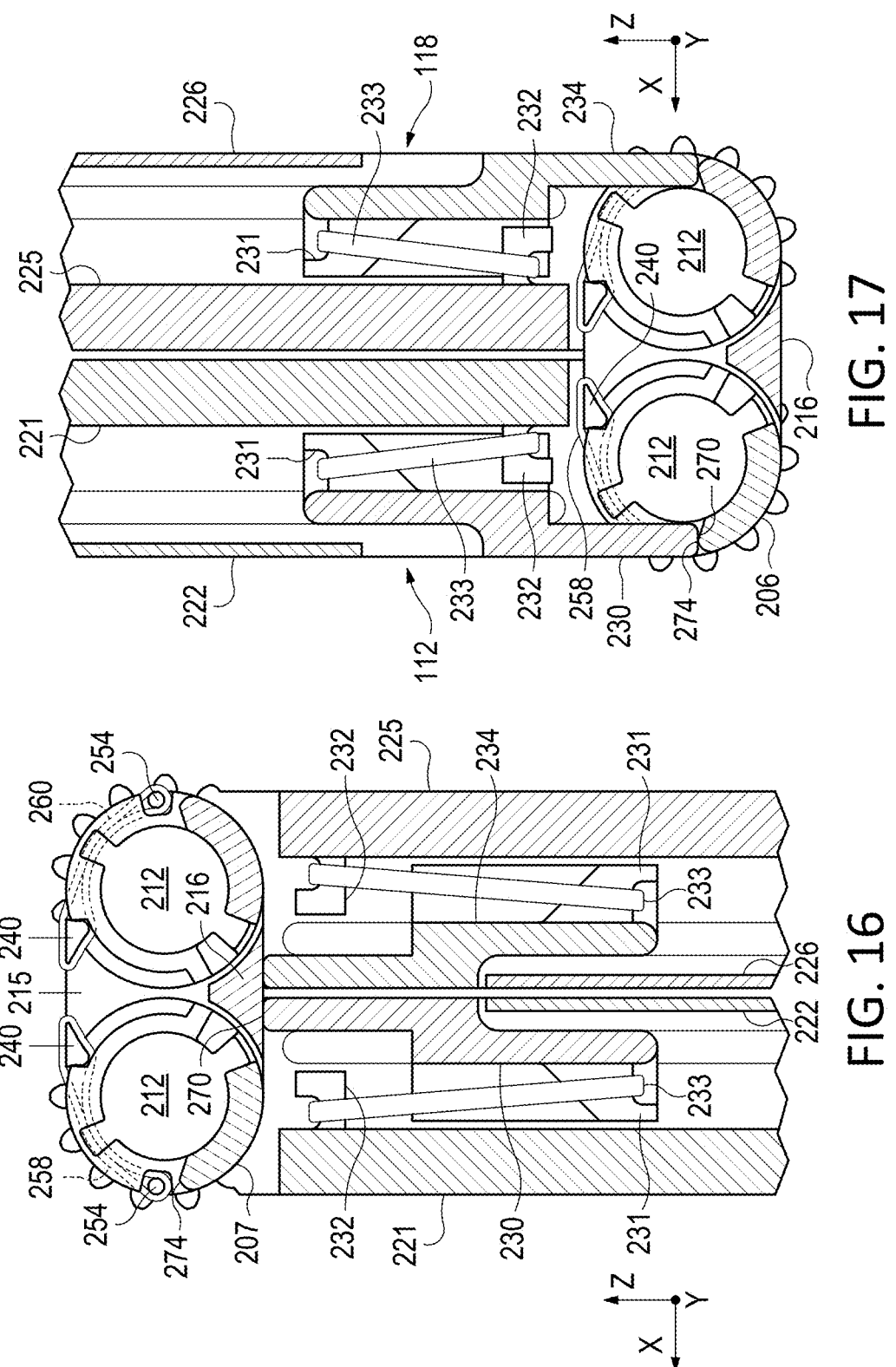
FIG. 16 shows the first display-supporting frame and the second display-supporting frame in the back-to-back 360-degree orientation.
FIG. 17 shows the first display-supporting frame and the second display-supporting frame in the face-to-face zero-degree orientation.

Additionally, as shown in FIGS. 15 and 16 and in another potential advantage of the present disclosure, the first rotatable partial barrel 206 includes an outer camming surface 207, and the contacting end 270 of the first rotatable partial barrel is operatively configured to follow the outer camming surface 207 when the first display-supporting frame 220 and the second display-supporting frame 224 are rotated from 180 degrees to 360 degrees relative to one another. More particularly and with reference to FIG. 14, as the first and second display-supporting frames 220, 224 are rotated from the 180-degree position of FIG. 14 to the 270-degree position of FIG. 15, the contacting end 270 of the first moveable slider plate 230 skips over the second lip 274 of the first rotatable partial barrel 206 and follows the outer camming surface 207. As the first and second display-supporting frames 220, 224 are rotated from the 270-degree position of FIG. 15 to the 360-degree position of FIG. 16, the contacting end 270 of the first moveable slider plate 230 travels onto the midplate 216 of the spine frame 215. Advantageously, in this manner the first moveable slider plate 230 cooperates with the first rotatable partial barrel 206 to provide continuous coverage of the first aperture 112 as the first display-supporting frame 220 and first backplate 222 translate toward the spine 204. As shown in FIGS. 14-16, it will also be appreciated that the second moveable slider plate 234 is configured in the same manner to provide continuous coverage of the second aperture 118 as the second display-supporting frame 224 and second backplate 226 translate toward the spine 204.

In this example and with reference to FIGS. 14-17, the computing device further comprises a first barrel biasing member in the form of a first elastic member 258 operatively configured to bias the first rotatable partial barrel 206 for rotation in a first direction (in these figures, the clockwise direction), and a second barrel biasing member in the form of a second elastic member 260 operatively configured to bias the second rotatable partial barrel 208 for rotation in a second direction (in these figures, the counterclockwise direction) opposite to the first direction. With reference to FIGS. 13-15, the first elastic member 258 is stretched over a first protrusion 240 that extends inwardly from the spine frame 215, travels in a recessed track 250 of the circular end portion 209, and is stretched over a projection 254 of the circular end portion that extends into the recessed track.

With reference to FIG. 17 that shows the first display-supporting frame 220 and the second display-supporting frame 224 in the face-to-face zero-degree orientation in which the flexible display (not shown) is in the interior of the device, in this orientation the first elastic member 258 biases the first rotatable partial barrel 206 in the clockwise direction against the contacting end 270 of the first moveable slider plate 230, which is also biased in the negative z-axis direction against the second lip 274 of the first rotatable partial barrel. Advantageously, this configuration causes the first moveable slider plate 230 to cover at least a portion of the first aperture 112 that is at least partially defined by the first leading edge 223 of the first backplate 222 and the first rotatable partial barrel 206 of the spine 204.

With reference to FIGS. 17 and 14, as the first display-supporting frame 220 and the second display-supporting frame 224 are rotated from the face-to-face zero-degree orientation of FIG. 17 to the end-to-end 180-degree orientation of FIG. 14, the contacting end 270 of the first moveable slider plate 230 contacts and rotates the first rotatable partial barrel 206 in the counterclockwise direction. In another potential technical advantage of this configuration, the opposing biasing elements of the first rotatable partial barrel 206 and the first moveable slider plate 230 operate to maintain contact between the contacting end 270 of the first moveable slider plate 230 and the second lip 274 of the first rotatable partial barrel 206 throughout this rotation of the first display-supporting frame 220 and the second display-supporting frame 224. Advantageously, in this manner the first moveable slider plate 230 operates to provide continuous coverage of at least a portion of the first aperture 112 throughout the various orientations of the first display-supporting frame 220 and the second display-supporting frame 224.

Figure 18:
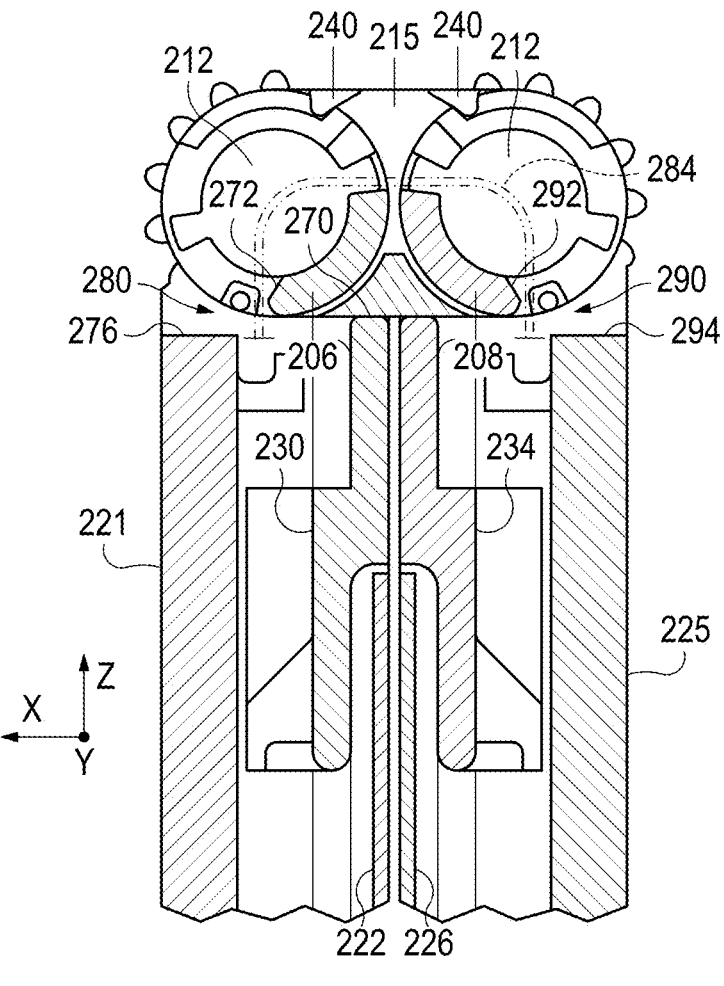
FIG. 18 shows another example of the computing device of FIG. 12 in the back-to-back 360-degree orientation in which the rotatable partial barrels are in a pass-through position that defines a pass-through aperture through which one or more components can pass.

With reference now to FIG. 18, in this example biasing members are not utilized to bias the first rotatable partial barrel 206 and second rotatable partial barrel 208. Accordingly, in this example the contacting end 270 of the first moveable slider plate 230 is operatively configured to rotate the first lip 272 of the first rotatable partial barrel 206 to a pass-through position shown in FIG. 18 as the first display-supporting frame and the second display-supporting frame are rotated to the closed back-to-back orientation at 360 degrees relative to one another. Advantageously, in this pass-through position the first lip 272 and a first end 276 of the first upper frame 221 of the first display supporting frame 220 define a first pass-through aperture 280 through which one or more components can pass.

In the example of FIG. 18, a portion of a flexible circuit 284 is shown passing from the interior of the first display-supporting frame through the first pass-through aperture 280, across and through the corresponding second pass-through aperture 290 that is defined by the first lip 292 of the second rotatable partial barrel 208 and a first end 294 of the second upper frame 225 of the second display-supporting frame 224. Accordingly, and in one potential advantage of this configuration, components such as cables, flexible circuits, etc. can be routed from the first display-supporting frame 220 to the second display-supporting frame 224 and maintained throughout rotations of the two frames.

With reference now to FIG. 19, an example method 300 for covering at least a portion of an aperture in a computing device will now be described. The following description of method 300 is provided with reference to the components described herein and shown in FIGS. 1-18. For example, the method 300 may be performed using the components of any of the examples of computing devices described herein.

It will be appreciated that following description of method 300 is provided by way of example and is not meant to be limiting. Therefore, it is to be understood that method 300 may include additional and/or alternative steps relative to those illustrated in FIG. 19. Further, it is to be understood that the steps of method 300 may be performed in any suitable order. Further still, it is to be understood that one or more steps may be omitted from method 300 without departing from the scope of this disclosure. It will also be appreciated that method 300 also may be performed in other contexts using other suitable components.

With reference to FIG. 19, the method 300 is described in conjunction with a computing device comprising an aperture that is at least partially defined by a first leading edge of a first backplate and a spine of the computing device. The computing device comprises a flexible display supported by a first display-supporting frame and a second display-supporting frame, with the first display-supporting frame comprising the first backplate opposite to the flexible display, and the second display-supporting frame comprising a second backplate opposite to the flexible display, where the first display-supporting frame is rotatably coupled to the second display-supporting frame via the spine.

At 304 the method 300 includes biasing a first moveable slider plate into contact with the spine to cover at least the portion of the aperture while the first display-supporting frame is translated relative to the spine and the first display-supporting frame is rotated relative to the spine. At 308 the method 300 includes, wherein the spine comprises an outer spine plate and the first moveable slider plate comprises a contacting end, biasing the contacting end into contact with a first curved side of the outer spine plate when the first display-supporting frame and the second display-supporting frame are positioned at 180 degrees relative to one another. At 312 the method 300 includes, wherein the outer spine plate is operatively configured as a camming surface, biasing the contacting end to follow the first curved side and a planar middle portion of the outer spine plate when the first display-supporting frame and the second display-supporting frame are rotated from 180 degrees to 360 degrees relative to one another.

At 316 the method 300 includes, wherein the computing device comprises a translation mechanism coupled to the first display-supporting frame via a support structure that is rotatably coupled to the spine, the translation mechanism operatively configured to translate the first display-supporting frame relative to the spine as the first display-supporting frame is rotated relative to the spine, biasing the first moveable slider plate against the support structure toward the spine. At 320 the method 300 includes, biasing the moveable slider plate against the first backplate of the first display-supporting frame toward the spine.

The following paragraphs provide additional support for the claims of the subject application. One aspect provides a foldable computing device comprising: a flexible display supported by a first display-supporting frame and a second display-supporting frame, the first display-supporting frame comprising a first backplate opposite to the flexible display, the second display-supporting frame comprising a second backplate opposite to the flexible display, the first display-supporting frame rotatably coupled to the second display-supporting frame via a spine; a translation mechanism coupled to the first display-supporting frame and configured to translate the first display-supporting frame relative to the spine as the first display-supporting frame is rotated relative to the spine; and a first moveable slider plate biased into contact with the spine to cover at least a portion of an aperture at least partially defined by a first leading edge of the first backplate and the spine. The foldable computing device may additionally or alternative include, wherein each moveable slider plate is coupled to the respective translation mechanism. The foldable computing device may additionally or alternative include, wherein the spine comprises an outer spine plate. The foldable computing device may additionally or alternative include, wherein the outer spine plate comprises a planar middle portion that transitions into a first curved side and an opposing second curved side. The foldable computing device may additionally or alternative include, wherein the first moveable slider plate comprises a contacting end that is biased into contact with the first curved side of the outer spine plate when the first display-supporting frame and the second display-supporting frame are positioned at 180 degrees relative to one another. The foldable computing device may additionally or alternative include, wherein the outer spine plate is operatively configured as a camming surface, and the contacting end is operatively configured to follow the first curved side and the planar middle portion when the first display-supporting frame and the second display-supporting frame are rotated from 180 degrees to 360 degrees relative to one another. The foldable computing device may additionally or alternative include, wherein the contacting end defines a groove that is operatively configured to capture a first edge of the first curved side when the first display-supporting frame and the second display-supporting frame are positioned at zero degrees relative to one another, and the contacting end is dislodged from contacting the first edge of the first curved side. The foldable computing device may additionally or alternative include, wherein the spine further comprises an inner spine plate opposite to the outer spine plate. The foldable computing device may additionally or alternative include, wherein the translation mechanism comprises a support structure rotatably coupled to the spine, the first display-supporting frame is moveably coupled to the support structure, and the first moveable slider plate is biased against the support structure toward the spine. The foldable computing device may additionally or alternative include, wherein the first moveable slider plate is biased against the first backplate of the first display-supporting frame toward the spine. The foldable computing device may additionally or alternative include, wherein the spine comprises a first rotatable partial barrel and a second rotatable partial barrel and the first moveable slider plate is biased into contact with the first rotatable partial barrel. The foldable computing device may additionally or alternative include, wherein the first moveable slider plate comprises a contacting end that is biased into contact with a first lip of the first rotatable partial barrel when the first display-supporting frame and the second display-supporting frame are positioned at 180 degrees relative to one another. The foldable computing device may additionally or alternative include, wherein the contacting end is operatively configured to rotate the first lip of the first rotatable partial barrel to a pass-through position as the first display-supporting frame and the second display-supporting frame are rotated to a closed orientation at 360 degrees relative to one another, wherein in the pass-through position the first lip and a first end of the first display-supporting frame define a pass-through aperture through which a component passes. The foldable computing device may additionally or alternative include, wherein the first rotatable partial barrel comprises an outer camming surface, and the contacting end is operatively configured to follow the outer camming surface when the first display-supporting frame and the second display-supporting frame are rotated from 180 degrees to 360 degrees relative to one another. The foldable computing device may additionally or alternative include, further comprising a first barrel biasing member operatively configured to bias the first rotatable partial barrel for rotation in a first direction, and a second barrel biasing member operatively configured to bias the second rotatable partial barrel for rotation in a second direction opposite to the first direction.

It will be appreciated that a translation mechanism and a moveable slider plate according to any embodiment or example above recited in connection with the first display-supporting frame can be utilized with the second display-supporting frame.

Another aspect provides a method for covering at least a portion of an aperture in a foldable computing device, the aperture at least partially defined by a first leading edge of a first backplate and a spine of the computing device, the computing device comprising a flexible display supported by a first display-supporting frame and a second display-supporting frame, the first display-supporting frame comprising the first backplate opposite to the flexible display, the second display-supporting frame comprising a second backplate opposite to the flexible display, the first display-supporting frame rotatably coupled to the second display-supporting frame via the spine, the method comprising: biasing a first moveable slider plate into contact with the spine to cover at least the portion of the aperture while the first display-supporting frame is translated relative to the spine and the first display-supporting frame is rotated relative to the spine. The method may additionally or alternatively include, wherein the spine comprises an outer spine plate, the first moveable slider plate comprises a contacting end, and the method comprises biasing the contacting end into contact with a first curved side of the outer spine plate when the first display-supporting frame and the second display-supporting frame are positioned at 180 degrees relative to one another. The method may additionally or alternatively include, wherein the outer spine plate is operatively configured as a camming surface, and the method comprises biasing the contacting end to follow the first curved side and a planar middle portion of the outer spine plate when the first display-supporting frame and the second display-supporting frame are rotated from 180 degrees to 360 degrees relative to one another. The method may additionally or alternatively include, wherein the computing device comprises a translation mechanism coupled to the first display-supporting frame via a support structure that is rotatably coupled to the spine, the translation mechanism operatively configured to translate the first display-supporting frame relative to the spine as the first display-supporting frame is rotated relative to the spine, the method further comprising biasing the first moveable slider plate against the support structure toward the spine. The method may additionally or alternatively include biasing the moveable slider plate against the first backplate of the first display-supporting frame toward the spine.

Another aspect provides a computing device foldable through 360 degrees, the computing device comprising: a flexible display supported by a first display-supporting frame and a second display-supporting frame, the first display-supporting frame comprising a first backplate opposite to the flexible display, the second display-supporting frame comprising a second backplate opposite to the flexible display, the first display-supporting frame rotatably coupled to the second display-supporting frame via a spine that comprises an outer spine plate; a translation mechanism coupled to the first display-supporting frame and configured to translate the first display-supporting frame relative to the spine as the first display-supporting frame is rotated relative to the spine, the translation mechanism comprising a support structure rotatably coupled to the spine, wherein the first display-supporting frame is moveably coupled to the support structure; and a first moveable slider plate biased into contact with the outer spine plate to cover at least a portion of an aperture at least partially defined by a first leading edge of the first backplate and the outer spine plate, wherein the first moveable slider plate is biased against the support structure toward the spine.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A foldable computing device, comprising:
a flexible display supported by a first display-supporting frame and a second display-supporting frame, the first display-supporting frame comprising a first backplate opposite to the flexible display, the second display-supporting frame comprising a second backplate opposite to the flexible display, the first display-supporting frame rotatably coupled to the second display-supporting frame via a spine;
a translation mechanism coupled to the first display-supporting frame and configured to translate the respective first display-supporting frame relative to the spine as the first display-supporting frame is rotated relative to the spine; and
a first moveable slider plate biased into contact with the spine to cover at least a portion of an aperture at least partially defined by a first leading edge of the first backplate and the spine.

2. The computing device of claim 1, wherein the spine comprises an outer spine plate.

3. The computing device of claim 2, wherein the outer spine plate comprises a planar middle portion that transitions into a first curved side and an opposing second curved side.

4. The computing device of claim 3, wherein the first moveable slider plate comprises a contacting end that is biased into contact with the first curved side of the outer spine plate when the first display-supporting frame and the second display-supporting frame are positioned at 180 degrees relative to one another.

5. The computing device of claim 4, wherein the outer spine plate is operatively configured as a camming surface, and the contacting end is operatively configured to follow the first curved side and the planar middle portion when the first display-supporting frame and the second display-supporting frame are rotated from 180 degrees to 360 degrees relative to one another.

6. The computing device of claim 4, wherein the contacting end defines a groove that is operatively configured to capture a first edge of the first curved side when the first display-supporting frame and the second display-supporting frame are positioned at zero degrees relative to one another, and the contacting end is dislodged from contacting the first edge of the first curved side.

7. The computing device of claim 2, wherein the spine further comprises an inner spine plate opposite to the outer spine plate.

8. The computing device of claim 1, wherein the translation mechanism comprises a support structure rotatably coupled to the spine, the first display-supporting frame is moveably coupled to the support structure, and the first moveable slider plate is biased against the support structure toward the spine.

9. The computing device of claim 1, wherein the first moveable slider plate is biased against the first backplate of the respective display-supporting frame toward the spine.

10. The computing device of claim 1, wherein the spine comprises a first rotatable partial barrel and a second rotatable partial barrel, and the first moveable slider plate is biased into contact with the first rotatable partial barrel.

11. The computing device of claim 10, wherein the first moveable slider plate comprises a contacting end that is biased into contact with a first lip of the first rotatable partial barrel when the first display-supporting frame and the second display-supporting frame are positioned at 180 degrees relative to one another.

12. The computing device of claim 11, wherein the contacting end is operatively configured to rotate the first lip of the first rotatable partial barrel to a pass-through position as the first display-supporting frame and the second display-supporting frame are rotated to a closed orientation at 360 degrees relative to one another, wherein in the pass-through position the first lip and a first end of the first display-supporting frame define a pass-through aperture through which a component passes.

13. The computing device of claim 11, wherein the first rotatable partial barrel comprises an outer camming surface, and the contacting end is operatively configured to follow the outer camming surface when the first display-supporting frame and the second display-supporting frame are rotated from 180 degrees to 360 degrees relative to one another.

14. The computing device of claim 10, further comprising a first barrel biasing member operatively configured to bias the first rotatable partial barrel for rotation in a first direction, and a second barrel biasing member operatively configured to bias the second rotatable partial barrel for rotation in a second direction opposite to the first direction.

15. A method for covering at least a portion of an aperture in a foldable computing device, the aperture at least partially defined by a first leading edge of a first backplate and a spine of the computing device, the computing device comprising a flexible display supported by a first display-supporting frame and a second display-supporting frame, the first display-supporting frame comprising the first backplate opposite to the flexible display, the second display-supporting frame comprising a second backplate opposite to the flexible display, the first display-supporting frame rotatably coupled to the second display-supporting frame via the spine, the method comprising:
biasing a first moveable slider plate into contact with the spine to cover at least the portion of the aperture while the first display-supporting frame is translated relative to the spine and the first display-supporting frame is rotated relative to the spine.

16. The method of claim 15, wherein the spine comprises an outer spine plate, the first moveable slider plate comprises a contacting end, and the method comprises biasing the contacting end into contact with a first curved side of the outer spine plate when the first display-supporting frame and the second display-supporting frame are positioned at 180 degrees relative to one another.

17. The method of claim 16, wherein the outer spine plate is operatively configured as a camming surface, and the method comprises biasing the contacting end to follow the first curved side and a planar middle portion of the outer spine plate when the first display-supporting frame and the second display-supporting frame are rotated from 180 degrees to 360 degrees relative to one another.

18. The method of claim 15, wherein the computing device comprises a translation mechanism coupled to the first display-supporting frame via a support structure that is rotatably coupled to the spine, the translation mechanism operatively configured to translate the first display-supporting frame relative to the spine as the first display-supporting frame is rotated relative to the spine, the method further comprising biasing the first moveable slider plate against the support structure toward the spine.

19. The method of claim 15, further comprising biasing the moveable slider plate against the first backplate of the first display-supporting frame toward the spine.

20. A computing device foldable through 360 degrees, the computing device comprising:

a flexible display supported by a first display-supporting frame and a second display-supporting frame, the first display-supporting frame comprising a first backplate opposite to the flexible display, the second display-supporting frame comprising a second backplate opposite to the flexible display, the first display-supporting frame rotatably coupled to the second display-supporting frame via a spine that comprises an outer spine plate;

a translation mechanism coupled to the first display-supporting frame and configured to translate the first display-supporting frame relative to the spine as the first display-supporting frame is rotated relative to the spine, the translation mechanism comprising a support structure rotatably coupled to the spine, wherein the first display-supporting frame is moveably coupled to the support structure; and a first moveable slider plate biased into contact with the outer spine plate to cover at least a portion of an aperture at least partially defined by a first leading edge of the first backplate and the outer spine plate, wherein the first moveable slider plate is biased against the support structure toward the spine.

* * * * *